United States Patent
Moskowitz et al.

(10) Patent No.: US 7,386,800 B2
(45) Date of Patent: Jun. 10, 2008

(54) PERSONALIZED, CUSTOMIZED ACHIEVEMENT RECOGNITION ITEMS

(75) Inventors: Avi Moskowitz, Teaneck, NJ (US); Warren Struhl, Boca Raton, FL (US)

(73) Assignee: American Registry, LLC, Teaneck, NJ (US)

( * ) Notice: Subject to any disclaimer, the term of this patent is extended or adjusted under 35 U.S.C. 154(b) by 608 days.

(21) Appl. No.: 10/721,045

(22) Filed: Nov. 21, 2003

(65) Prior Publication Data

US 2005/0114157 A1    May 26, 2005

(51) Int. Cl.
*G06F 3/00*    (2006.01)
(52) U.S. Cl. .............................. 715/760; 705/1; 705/26
(58) Field of Classification Search .................... 428/13
See application file for complete search history.

(56) References Cited

U.S. PATENT DOCUMENTS

| | | | |
|---|---|---|---|
| 5,884,944 A | | 3/1999 | Durham |
| 5,970,471 A * | | 10/1999 | Hill .............................. 705/26 |
| 5,978,648 A * | | 11/1999 | George et al. .............. 434/362 |
| 6,042,904 A | | 3/2000 | Greenblat et al. |
| 6,317,722 B1 * | | 11/2001 | Jacobi et al. ................. 705/14 |
| 6,321,211 B1 * | | 11/2001 | Dodd ........................... 705/26 |
| 6,412,073 B1 * | | 6/2002 | Rangan .......................... 726/5 |
| 6,484,149 B1 * | | 11/2002 | Jammes et al. ............... 705/26 |
| 6,493,677 B1 * | | 12/2002 | von Rosen et al. ........... 705/27 |
| 6,578,012 B1 * | | 6/2003 | Storey .......................... 705/14 |
| 6,665,587 B2 * | | 12/2003 | Leone et al. ................ 700/235 |
| 6,668,210 B1 * | | 12/2003 | Kim et al. ................... 700/235 |
| 6,859,212 B2 * | | 2/2005 | Kumar et al. ................ 715/744 |
| 7,013,289 B2 * | | 3/2006 | Horn et al. .................... 705/26 |
| 7,117,168 B2 * | | 10/2006 | Eaton .......................... 705/26 |
| 2002/0029179 A1 * | | 3/2002 | Gruber et al. ................. 705/35 |
| 2002/0046138 A1 * | | 4/2002 | Fitzpatrick et al. ........... 705/27 |
| 2002/0048037 A1 * | | 4/2002 | Carbone .................... 358/1.14 |
| 2002/0049634 A1 * | | 4/2002 | Longinotti .................... 705/14 |
| 2002/0120497 A1 * | | 8/2002 | King ............................ 705/14 |
| 2002/0120511 A1 * | | 8/2002 | Hanes .......................... 705/14 |
| 2002/0156688 A1 * | | 10/2002 | Horn et al. .................... 705/26 |
| 2003/0055871 A1 * | | 3/2003 | Roses ........................ 709/203 |
| 2003/0081004 A1 * | | 5/2003 | Liguori ....................... 345/764 |
| 2004/0250202 A1 * | | 12/2004 | Williams .................... 715/513 |
| 2006/0116932 A1 * | | 6/2006 | Storey .......................... 705/14 |

OTHER PUBLICATIONS

PCT Application WO 01/86545 A2, Carlson Marketing Group, Inc., Nov. 15, 2001.*
Successories.com, "Successories: #1 Source For Motivational Gifts & Awards," http://web.archive.org/web/20020925180707/http://successories.com/, Sep. 25, 2002.*

(Continued)

*Primary Examiner*—Weilun Lo
*Assistant Examiner*—Eric A Wiener
(74) *Attorney, Agent, or Firm*—Fish & Richardson P.C.

(57) ABSTRACT

An achievement recognition item may be ordered through an interactive, on-line network site that allows a potential customer to personalize and customize the achievement recognition item. Information that includes user-selected specifications for customizing and personalizing features of the achievement recognition item is received through the network site from the user. The achievement recognition item may then be produced in accordance with the user-selected specifications.

32 Claims, 10 Drawing Sheets

OTHER PUBLICATIONS

Successories.com, "Successories: Engraving," http://web.archive.org/web/20030207082343/successories.com/customer/cs_engraving.asp..., Feb. 7, 2003.*

Successories.com, "Successories: Logo Services," http://web.archive.org/web/20030207083512/successories.com/customer/logo/logo_intro.a..., Feb. 7, 2003.*

Successories.com, "Successories: Product / Engraved Awards," http://web.archive.org/web/20011211193126/www.successories.com/type.asp?nav_id_stor..., Dec. 11, 2001.*

Successories.com, "Successories: Quality Framing," http://web.archive.org/web/20030207081220/successories.com/about_us/au_qualframe.asp..., Feb. 7, 2003.*

Successories.com, "Successories: Place Catalog Order," http://web.archive.org/web/20030207084241/successories.com/eob.asp?nav_id_store=1&n..., Feb. 7, 2003.*

Successories.com, "Successories: Product / Engraved Awards / Item Detail," http://web.archive.org/web/20020112142723/www.successories.com/prodetail.asp?nav_id..., Jan. 12, 2002.* ePromos.com, "ePromos: Promotional products, imprinted promotional items, tradeshow giveaways, corp . . . ," http://web.archive.org/web/20021119225256/http://www.epromos.com/, Nov. 19, 2002.*

* cited by examiner

FIG. 6

PERSONALIZED, CUSTOMIZED ACHIEVEMENT RECOGNITION ITEMS

BACKGROUND

This disclosure relates to personalized, customized achievement recognition items.

Various institutions, companies and other organizations provide achievement awards to individuals or groups for outstanding achievements in a wide range of areas. One popular type of achievement recognition item includes a plaque in the form of an inscribed tablet. Other achievement recognition items include, for example, medals and statues. Such awards are one way that an organization can show its appreciation for employees' or others' achievements and can help provide incentives for others to improve their performance. Such recognition awards also allow the recipient to commemorate an achievement. For example, some companies award medals, statues or plaques to employees who demonstrate excellence in the performance of their jobs. Similarly, sports organizations and teams often give trophies, plaques or other achievement recognition items to outstanding players or winning teams. Scientific and professional organizations may recognize various types of achievements by persons practicing in a particular scientific field or profession.

Situations exist, however, in which the recipient of an award or a person recognized for a particular achievement does not receive a plaque or other achievement recognition item. In other cases, a person may receive an achievement recognition item, but may wish to have a different achievement recognition item to commemorate the achievement.

SUMMARY

The present invention allows achievement recognition items to be ordered through an interactive, on-line network site that allows a potential customer to personalize and customize the achievement recognition item.

In one aspect, a method includes providing an on-line, interactive network site from which a user can customize and personalize specifications for an achievement recognition item. Information that includes user-selected specifications for customizing and personalizing features of the achievement recognition item is received through the network site from the user. The method includes producing the achievement recognition item in accordance with the user-selected specifications.

In another aspect of the invention, a system includes a computer network and a user device, with a display, coupled to the network. The system also includes circuitry coupled to the network to: (i) provide an on-line, interactive network site from which a user of the user device can customize and personalize specifications for an achievement recognition item, (ii) receive from the user, through the network site, information that includes user-selected specifications for customizing and personalizing features of the achievement recognition item, and (iii) store the received information. The stored information may be used to produce the achievement recognition item in accordance with the user-selected specifications.

According to another aspect, an article comprises a machine-readable medium storing machine-executable instructions that, when applied to a machine, cause the machine to: (i) provide an on-line, interactive network site from which a user can customize and personalize specifications for an achievement recognition item, and (ii) store information received through the network site from the user, where the information includes user-selected specifications for customizing and personalizing features of the achievement recognition item.

In various implementations, one or more of the following features may be present. For example, a personalized network page may be provided to the user to allow the user to customize and personalize features of the achievement recognition item. The personalized network page may include a pre-populated list of one or more achievements attained by the user, any of which the user may select for customizing and personalizing an achievement recognition item.

A sample image of the achievement recognition item may be provided to the user through the on-line interactive network site. The image may be updated, in response to receiving user input through the network site, in accordance with user-selected specifications for customized and personalized features of the achievement recognition item.

The achievement recognition item may include text that reflects an achievement attained by the user. For example, the achievement recognition item may include a document mounted on or embedded in a substrate, where the document reflects an achievement attained by the user.

The user-selected specifications may include, for example, one or more of the following: a substrate material, a color for a portion of the achievement recognition item, or text that reflects the achievement attained by the user.

In some implementations, the achievement recognition item may include an engraved plate mounted on a substrate. The user-selected specification may include text to be engraved on the plate. Additionally, the user-selected specifications may include (i) the type size of the text and (ii) the font size of the text.

In some implementations, other features of the achievement recognition item may be personalized or customized through the interactive network site.

In various implementations, one or more of the following advantages may be provided. For example, the invention may facilitate the ability of individuals to commemorate awards or other achievements they have attained. Moreover, the invention can allow the person attaining the achievement to order an achievement recognition item, such as a plaque, according to specifications selected by the individual, rather than a third-party.

Other features and advantages will be readily apparent from the following detailed description, the accompanying drawings and the claims.

BRIEF DESCRIPTION OF THE DRAWINGS

FIG. 6 illustrates an example of a page that allows a user to personalize features of the plaque.

DETAILED DESCRIPTION

Figure 1:
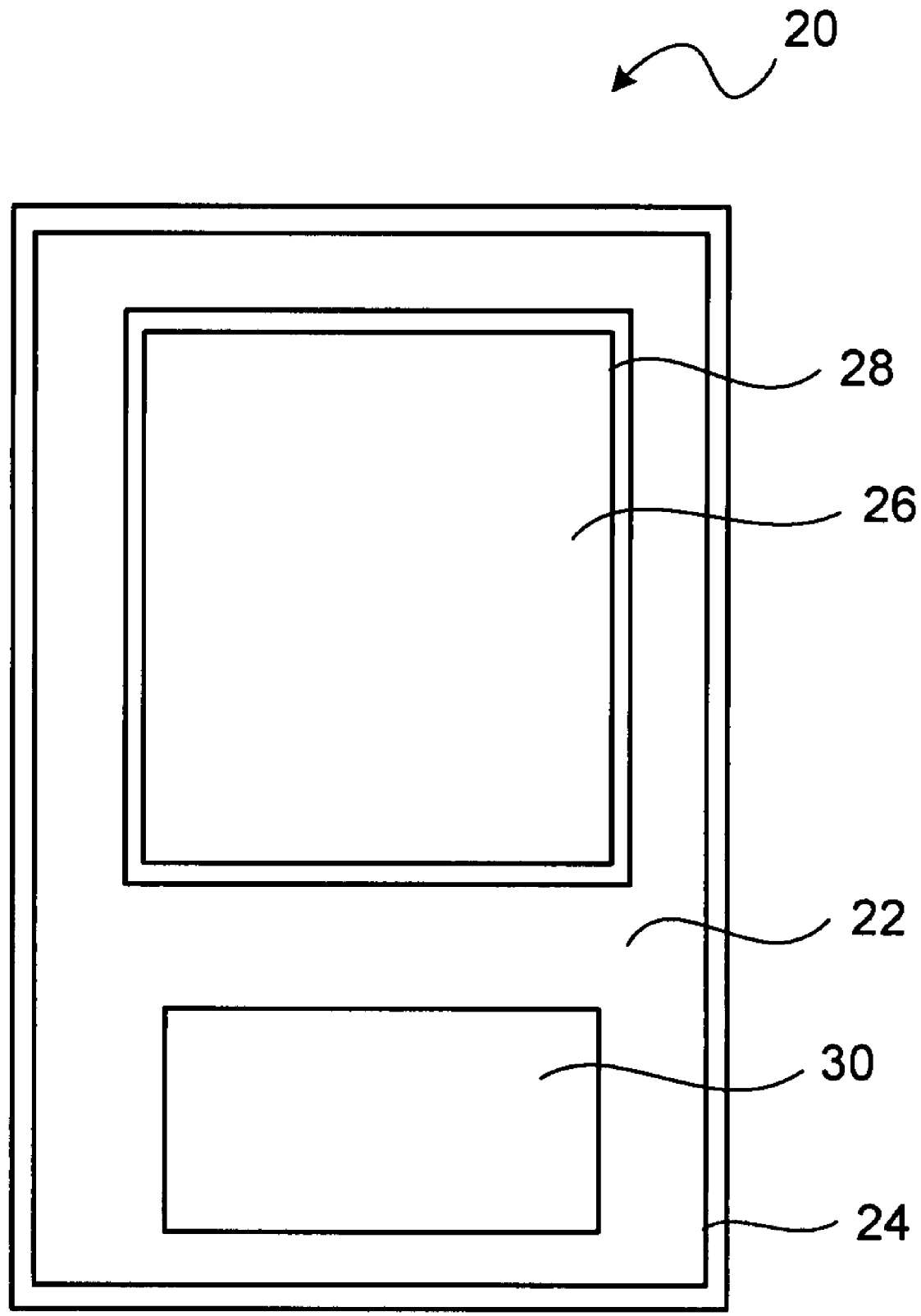
FIG. 1 illustrates an example of an achievement recognition item.

FIG. 1 illustrates an example of an achievement recognition item, in this case a plaque 20, with a laminated document 26 affixed to a substrate 22. The plaque may be designed to hang from a wall or rest, for example, on a desktop or shelf. The document 26 may comprise, for example, a certificate, an award, a diploma, a published article or any other document that reflects an award or other achievement attained by an individual or group. The document 26 may include text, graphics, or a combination of text and graphics. The laminated document 26 may be surrounded by a bevel 28 about its periphery, and the substrate 22 includes a trim 24. The substrate may be made, for example, of metal, wood, or a plastic or glass material, such as Lucite. Other materials may be used as the substrate as well.

As shown in FIG. 1, a personalized, laser-engraved plate 30 is attached to the substrate 22 on the same side of the plaque as the laminated document 26. The plate 30 may be made, for example, of brass.

Another example of an achievement recognition item includes a translucent substrate with an embedded certificate or other document that reflects an achievement attained by an individual or group. For example, the substrate may comprise a clear glass or plastic material, such as Lucite, that allows the certificate or other document to be viewed when embedded within the substrate.

Other types of achievement recognition items may be customized and personalized using the system described in greater detail below.

Figure 2:
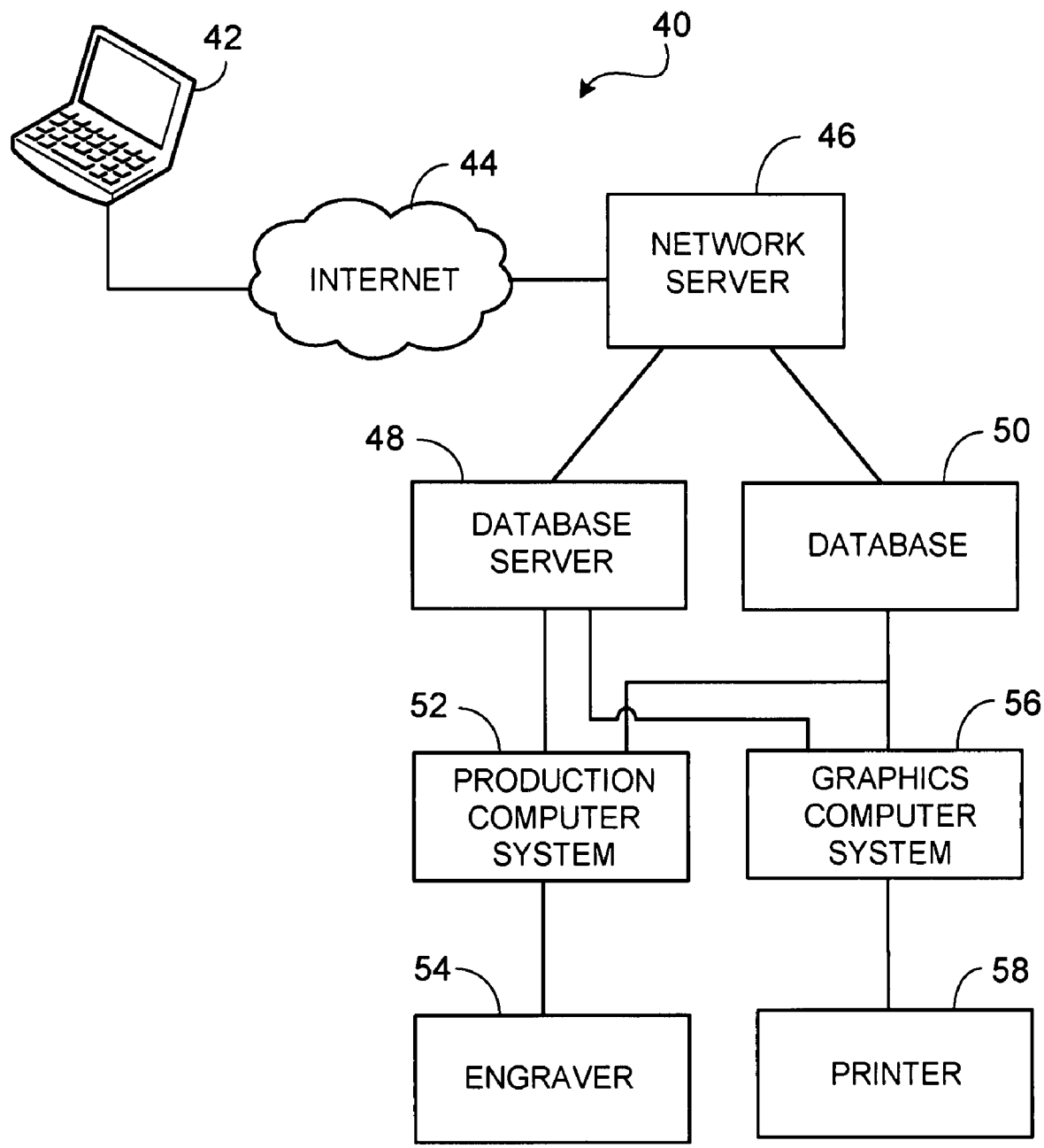
FIG. 2 illustrates an example of an on-line interactive system according to the invention.

As shown in FIG. 2, an on-line, interactive computer system 40 allows a user to access a network site through the Internet or other computer network 44 by using a device such as a personal computer 42 that includes a browser and display screen. The device also includes means (e.g., an electronic mouse and keyboard) to allow the user to make selections and enter information on the display. Access to the network site also may be provided through other types of user devices, such as a personal digital assistant (PDA).

A network server 46 associated with the network site is coupled to the network 44 and is configured to allow an individual to customize and personalize a plaque through a personalized web page. Information regarding details of the plaque, including the customized and personalized features selected by the individual, may be stored in a database 50 with an associated server 48. The information may be stored in the database 50, for example, in digital format. Once the system electronically captures the customized and personalized information selected by the user, a production computer system 52 and a graphics computer system 56 may use the information stored in the database 50 to produce various portions of the plaque. In one implementation, for example, the production computer system 52 can send information to a laser-engraver 54 to produce the laser-engraved plate 30. Similarly, the graphics computer system 56 can send information to a printer 58 to generate the achievement recognition item 26. Other peripheral components may be coupled to the computer systems 52, 56 depending on the particular plaques available through the network site.

In one particular implementation, persons associated with the network site initially obtain information about an individual's achievement(s). Such information may come directly from a company that employs the individual, from the media or from other sources. Images of documents reflecting the achievement(s) are stored in the database 50.

A sales agent or other person associated with the network site may contact a potential customer, for example, by telephone, electronic mail (email), postal mail or facsimile, and offer to allow the customer to preview images of one or more plaques or other achievement recognition items that relate to achievement(s) the individual has attained. A message then may be sent, for example, by email, regular mail, facsimile, or any other delivery format, to the potential customer. The message may include a picture of the plaque, as well as instructions for accessing and logging on to the network site. If the message is sent, for example, by email, then a hyperlink to the network site may be included. In one particular implementation, a user name and password are included in the message.

Figure 3:
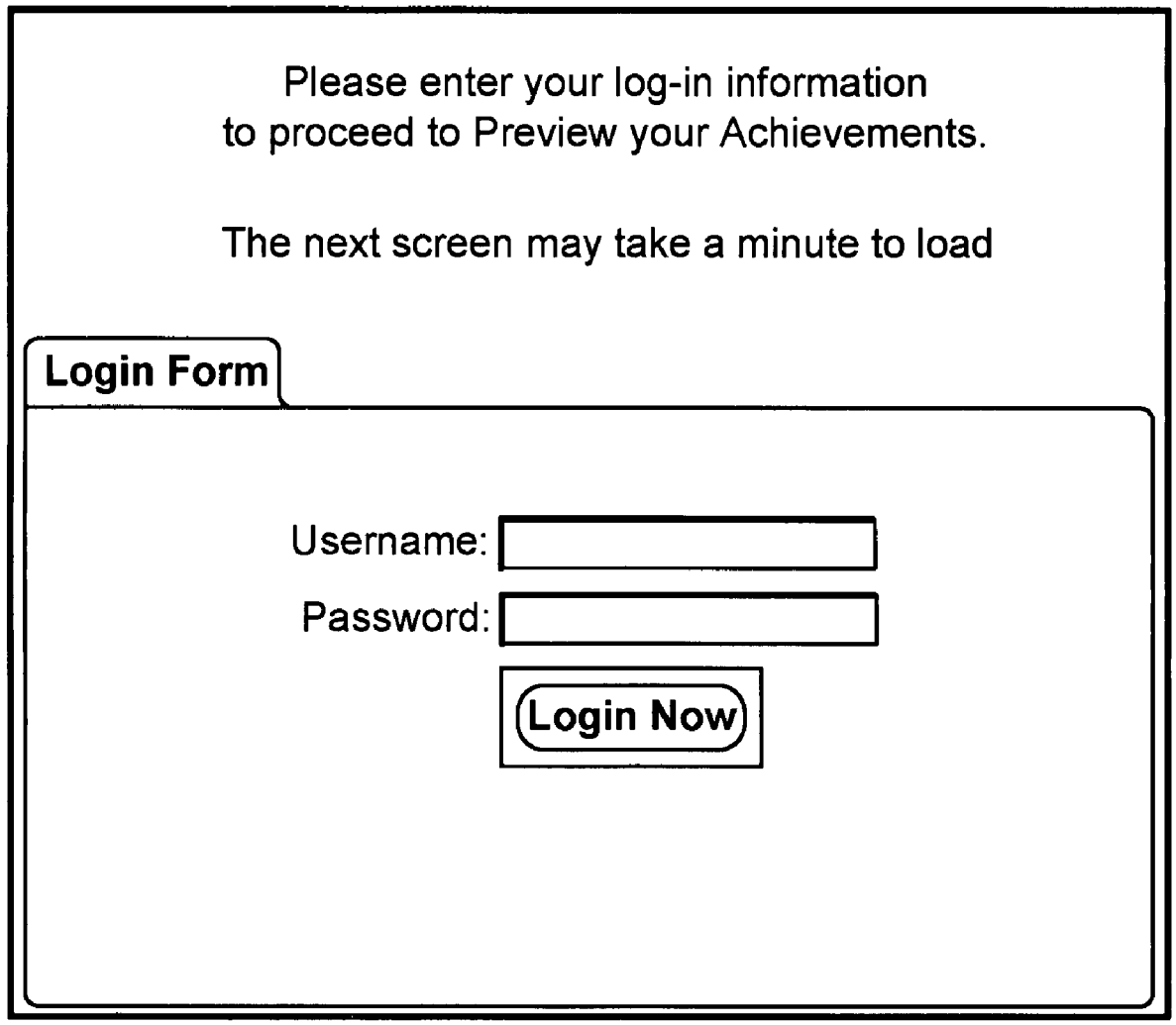
FIG. 3 illustrates an example of a network site home page.

FIG. 3 illustrates an example of a home page from which the user may log in. When the prospective customer accesses the home page of the network site from a user device (e.g., the personal computer 42) and enters her user name and password, the system links the user's device to a personal home page, which is displayed on the user's device. The personal home page provides information about one or more personalized, customized achievement recognition items, such as plaques, that are available to the user. Each plaque may include a document 26 that reflects an achievement by the user.

Figure 4:
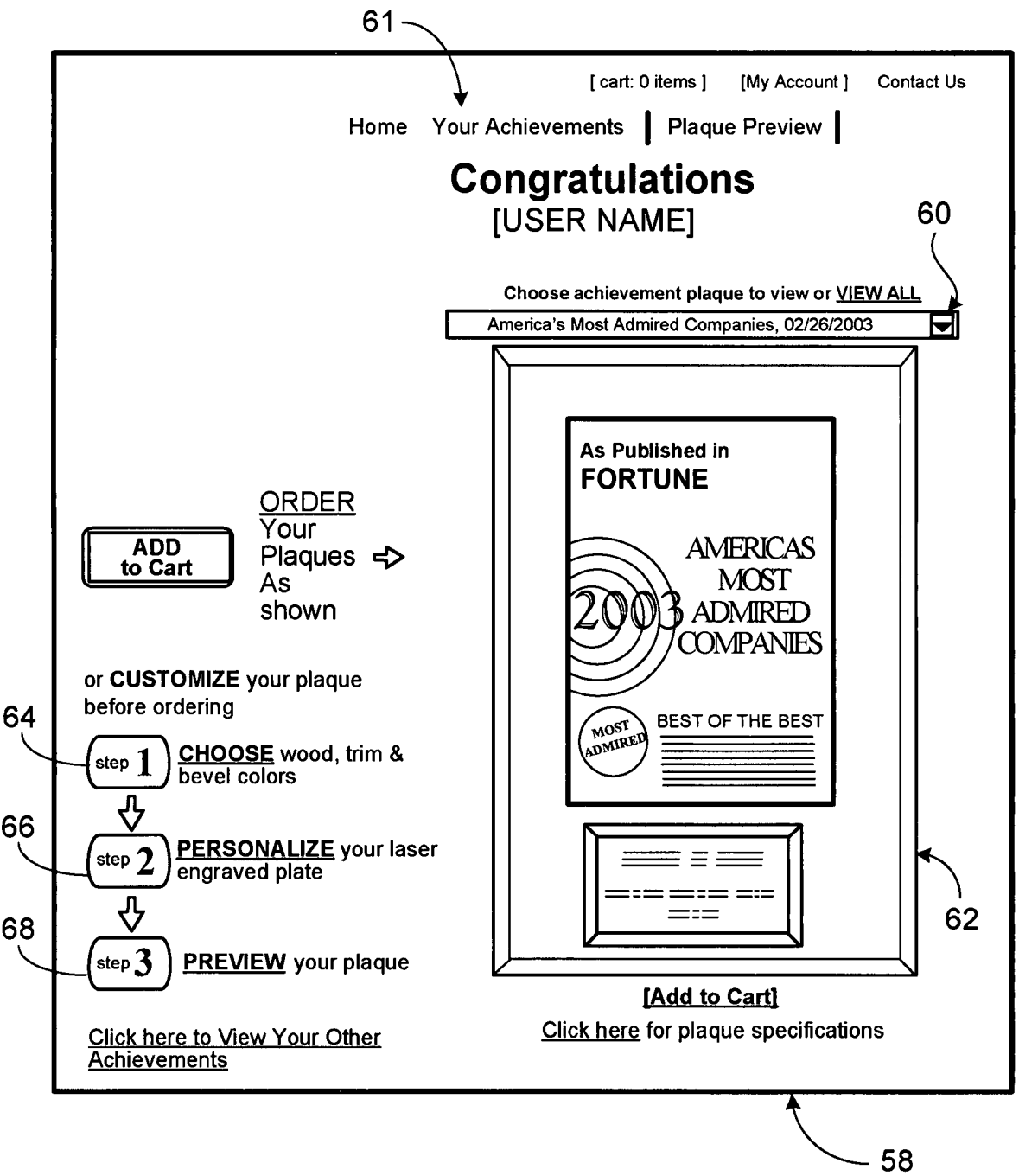
FIG. 4 illustrates an example of a personalized home page that allows a user to personalize and customize specifications of a plaque.

FIG. 4 illustrates an example of a personal home page 58 for a particular user. The personalized home page includes a list of one or more achievements attained by the user. The achievements may have been attained by the individual personally or as a member of a group, such as a company, a team or some of other entity. As shown in FIG. 4, a drop-down menu 60 allows the prospective customer to select from among one or more achievements. In the illustrated example, the user may select a plaque, for example, that includes a certificate for the user's company being recognized as one of America's most admired companies. Plaques for other achievements may be selected from the drop-down menu as well. An image of a sample plaque 62 (or other achievement recognition item) for the selected achievement appears on the web page 58.

Alternatively, to view sample images of the achievement recognition items available to the particular user, the user may click on the tab 61 labeled "Your Achievements." In response to the user's clicking that tab, the system displays a page on the user's device that shows sample images of the available achievement recognition items. If the user clicks on a particular image, the system then displays a page that is similar to FIG. 4 for the selected achievement recognition item.

Figure 5:
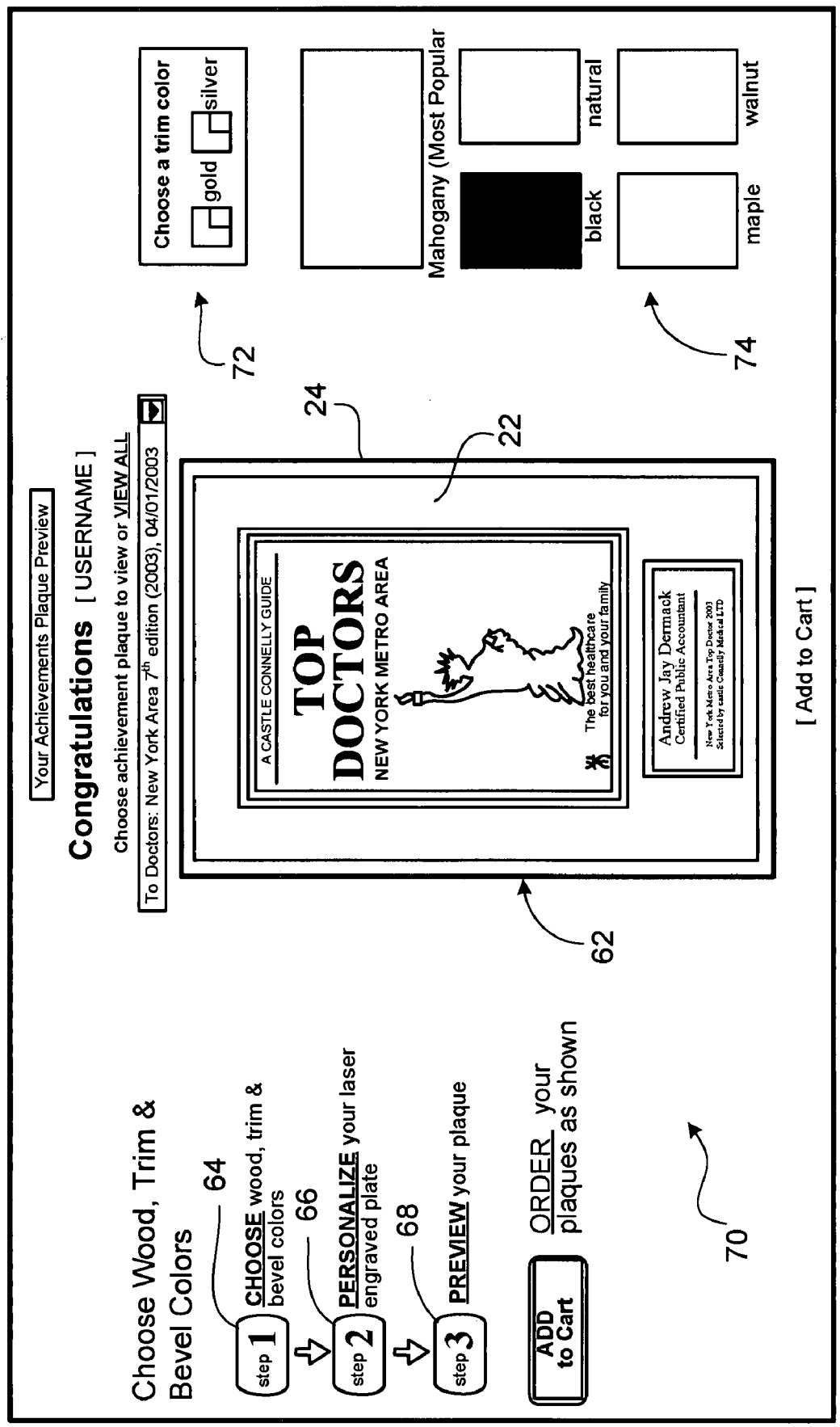
FIG. 5 illustrates an example of a page that allows the user to customize features of the plaque.

Several buttons 64, 66 and associated links appear on the web page 58 to allow the prospective customer to customize and personalize various features of the plaque 62 (or other achievement item) for the selected achievement. For example, to customize the plaque 62, the user would select the button 64. In response to the user's clicking on the button 64 using, for example, an electronic mouse coupled to the user's device 42, the system retrieves and displays another web page 70 (FIG. 5) on the user's device. The user may select the color of the trim 24 and bevel 28 from among two or more options by clicking the appropriate selection 72. In the illustrated example, the user may choose either gold or silver trim. The user also may select the wood finish for the substrate 22 from among two or more options by clicking on an appropriate selection 74. In the illustrated example, the user may select mahogany, black, natural, maple or walnut as the wood finish.

In other implementations, additional or different choices may be available for the trim and bevel colors and wood finish. In some implementations, the system may allow the user to select other features of the plaque 62, such as the size and shape of the plaque or the material of the substrate. The system stores the user's selections in the database 50 (FIG. 2). If the user does not make a selection with respect to a particular feature, the system stores a default selection for that feature.

Figure 6:
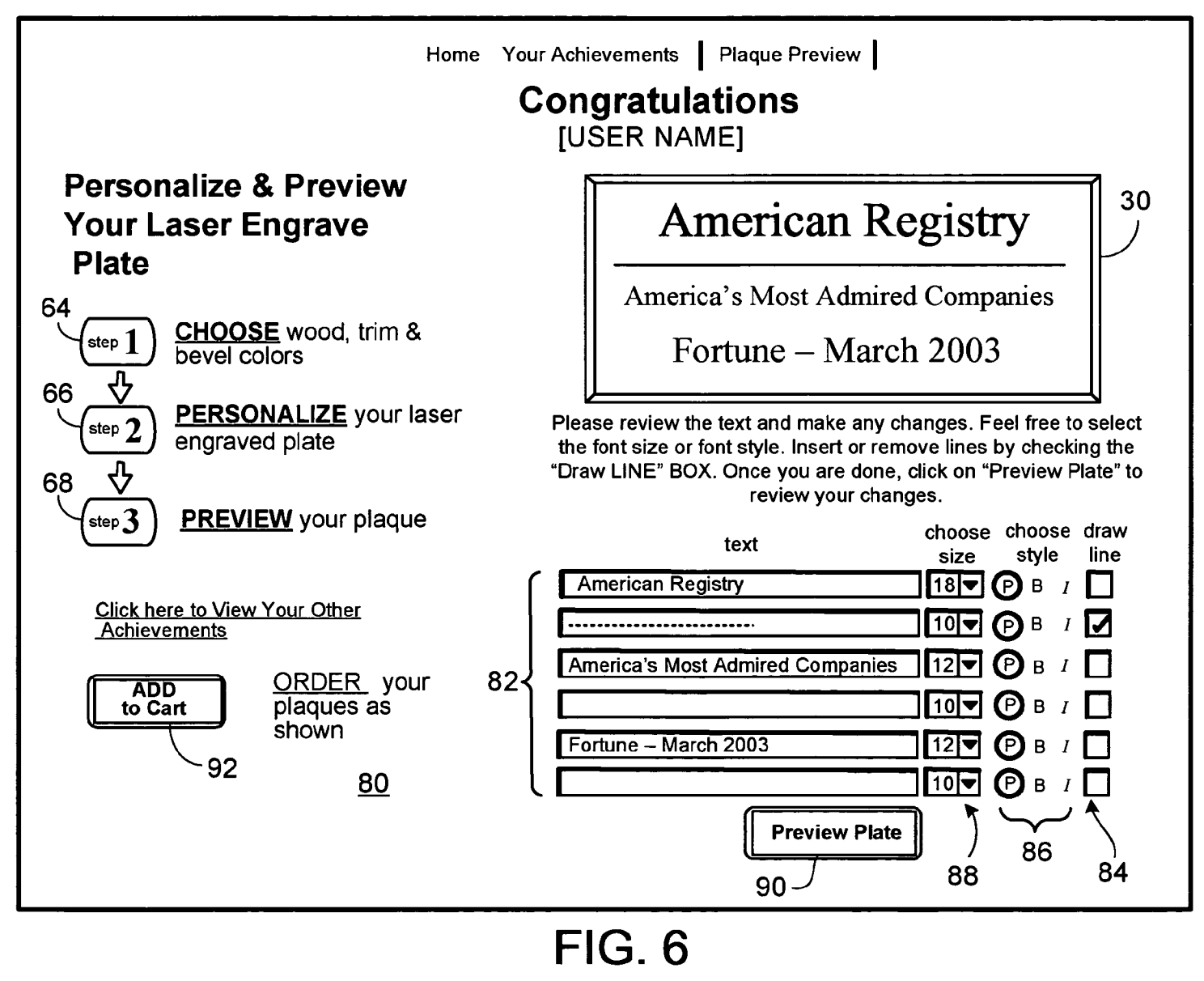

To personalize the plaque, the user would select the button 66. In response to the user's clicking on the button 66, the system retrieves and displays another web page 80 (FIG. 6) on the user's device. The page 80 allows the prospective customer to personalize the text that will appear on the laser-engraved plate 30 for the plaque. The text appearing on the plate 30 typically would relate to the achievement attained by the user. A sample text may be provided by the system as a starting point for the user (see FIG. 7). The sample text may be accepted by the user or modified by changing the text that appears in the designated areas 82. In addition to text, a line may be inserted or removed simply by clicking the appropriate box in the column 84 labeled "draw line." Similarly, the font style (e.g., plain, bold or italics) may be selected independently for each line of text by clicking on the appropriate buttons 86. The font size also may be selected independently for each line of text by clicking the desired size from drop-down menus 88.

Figure 7:
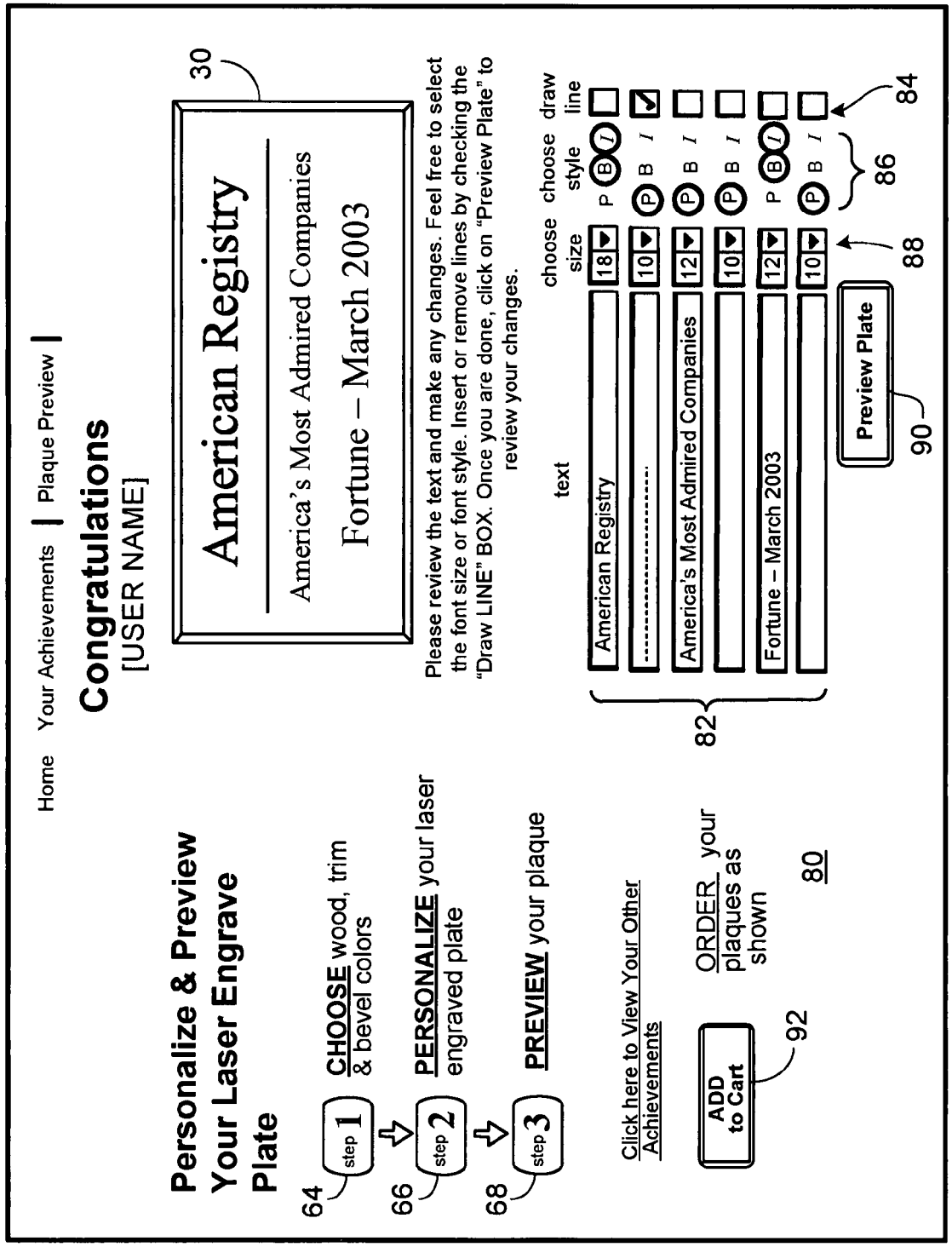
FIG. 7 illustrates an example of a page that allows a user to personalize features of the plaque.
Figure 8:
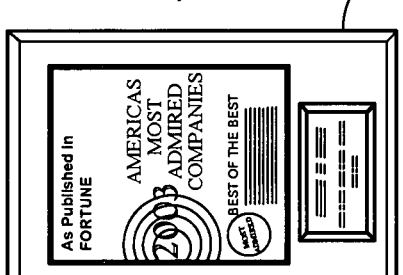
FIG. 8 illustrates the page of FIG. 6 where the user has made selections for personalizing features of the plaque.

The user may view how the laser-engraved plate 30 will appear with the modified text by clicking the button 90 labeled "Preview Plate." For example, FIG. 8 illustrates a preview of the plate 30 with the same text as in FIG. 7, except that the text in the first and last lines appears in bold, italicized letters, and the font size of the text in the last line has been increased. If the user had modified the text, then the modified text would appear on the preview of the plate. In some implementations, the system may be configured to change the illustration of the plate 30 that appears on the page 80 in real-time, in other words, without the user having to click the button 90.

Although the foregoing example allows the user to personalize the plate 30, in other implementations, the system may allow the user to personalize text or graphics appearing on the certificate 26 or other document that is mounted on or embedded within the substrate 22. A recognition text box (not shown) may be provided on the web page for that purpose. Similarly, some achievement recognition items may include personalized information that relates to the achievement etched, engraved or written directly on the substrate 22.

At any point in the process, the prospective customer may preview an image of the customized, personalized plaque 20 by clicking on the button 68 or an associated link. Any changes and selections made by the user will appear in the pictured plaque. To make additional changes, the user may click on the appropriate button 64, 66 and makes the desired changes.

Figure 9:
FIG. 9 illustrates a page from that allows the user to place an order for one or more plaques.

After making any desired changes to the plaque specifications, the user may place an order for the plaque (or other achievement recognition item) according to the user-selected specifications by clicking on the button 92 labeled "ADD to Cart" or the associated link labeled "ORDER you plaque as shown." In response, the system displays a page 100 (FIG. 9) on the user's device. The user can complete her order from the page 100, which shows a reduced image 102 of the selected plaque and lists the plaque specifications 104 as selected by the user. The user can select the quantity of plaques to be ordered by entering the appropriate number in the box 106. The unit price and total price are listed, respectively, in columns 108, 110. The user may select a method of shipping the completed plaque from a drop-down menu 114. A box 112 may be selected by the user if sales tax is applicable to the transaction, and a promotion code (if any) may be entered in the box 116. The user would then click the button 118 labeled "Checkout." In response to the user's clicking the "Checkout" button 118, the system calculates the total amount to be charged, including shipping and handling fees, as well as any discounts based on the promotion code entered in box 116.

Figure 10:
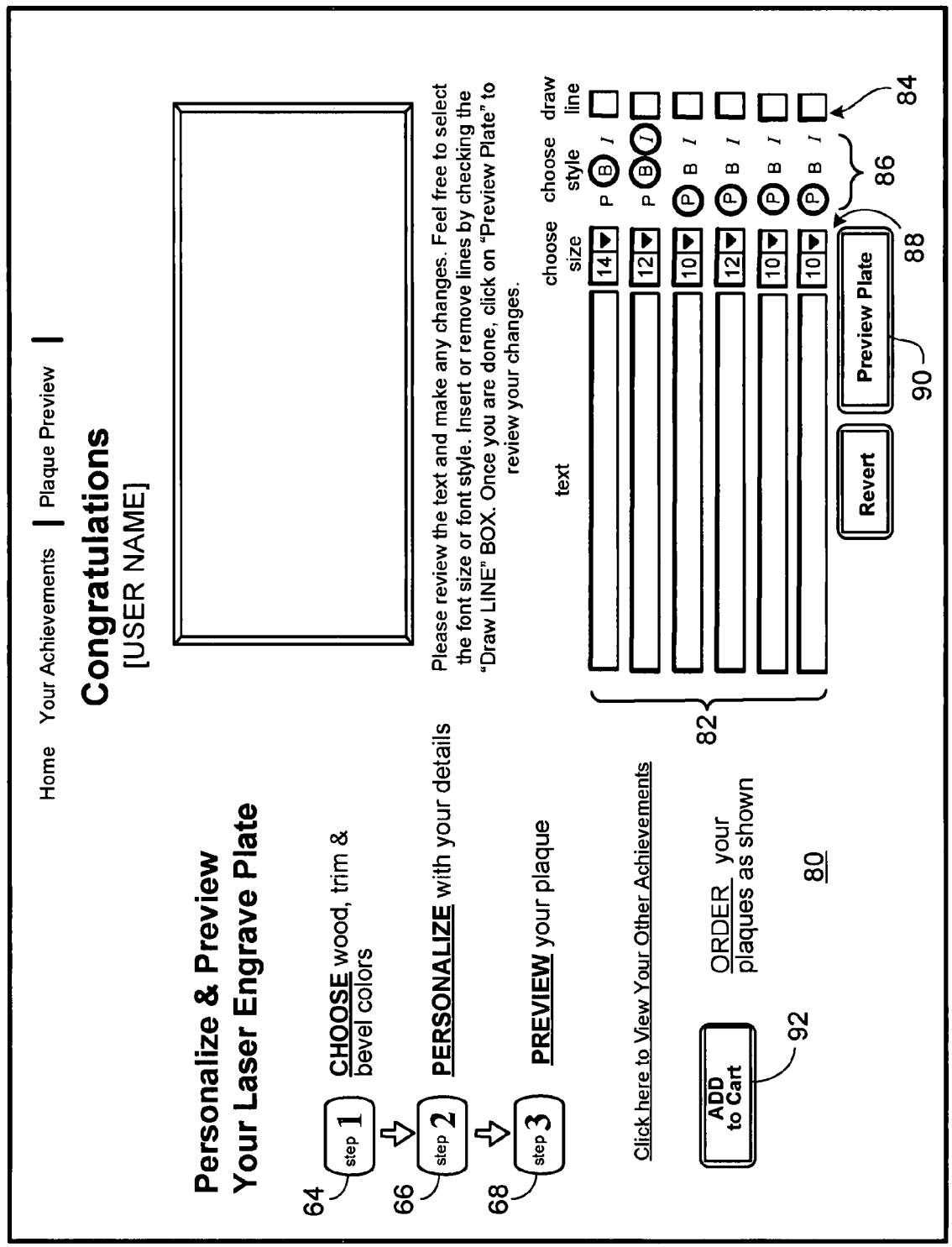
FIG. 10 illustrates a page that allows the user to complete placement of the order.

The amounts 122 to be billed to the customer are displayed on a page 120 (FIG. 10) that appears on the user's device 42 along with the reduced image of the plaque 102, the plaque specifications 104, the number of plaques ordered, and the corresponding price information. Similar types of information would appear on the page 120 if the user places an order for other personalized, customized achievement recognition items.

Additional information required for processing the order, including billing and shipping addresses, as well as method of payment, may be entered by the user on the specified sections 124 of the page 120. The user would then click the button 126 labeled "Complete Order."

As the user enters information and makes various selections to personalize and customize the plaque (or other achievement recognition item), the system captures and stores that information. Once the information relating to a particular order is stored, the stored information may be used to product the certificate or other document 26, as well as the plate 30, according to the user-selected specifications. The entire achievement recognition item then may be completed according to the user-selected specifications, and the completed item may be shipped to the customer.

Various aspects of the system may be implemented in hardware, software or a combination of hardware and software. Circuitry, including dedicated or general purpose machines, such as computer systems and processors, may be adapted to execute machine-readable instructions to implement the techniques described above. Computer-executable instructions for implementing the techniques can be stored, for example, as encoded information on a computer-readable medium such as a magnetic floppy disk, magnetic tape, or compact disc read only memory (CD-ROM).

Other implementations are within the scope of the claims.

What is claimed is:

1. A method comprising:
providing an on-line, interactive network site including a personalized network page from which a user can customize and personalize specifications for a three-dimensional achievement recognition item, wherein the personalized network page includes a pre-populated list of one or more achievements attained by the user, any of which the user can select for customizing and personalizing the achievement recognition item;
receiving information through the network site from the user, wherein the information includes user-selected specifications for customizing and personalizing features of the achievement recognition item for an achievement selected by the user from the pre-populated list; and producing the achievement recognition item in accordance with the user-selected specifications.

2. The method of claim 1 wherein the achievement recognition item comprises text that reflects an achievement attained by the user.

3. The method of claim 2 wherein the achievement recognition item comprises a document mounted on or embedded in a substrate, wherein the document reflects an achievement attained by the user.

4. The method of claim 3 wherein the user-selected specifications include a substrate material.

5. The method of claim 3 wherein the user-selected specifications include a color for the substrate.

6. The method of claim 2 wherein the user-selected specifications include text that reflects the achievement attained by the user.

7. The method of claim 2 wherein the achievement recognition item comprises an engraved plate mounted on a substrate, wherein the user-selected specifications include text to be engraved on the plate.

8. The method of claim 7 wherein the user-selected specifications include at least one of the following: (i) type style of the text and (ii) font size of the text.

9. A system comprising:
a computer network;
a user device coupled to the network, the user device including a display;
circuitry coupled to the network to:
provide an on-line, interactive network site including a personalized network page from which a user of the user device can customize and personalize specifications for a three-dimensional achievement recognition item, wherein the personalized network page includes a pre-populated list of one or more achievements attained by the user, any of which the user can select for customizing and personalizing an achievement recognition item;
receive information through the network site from the user, wherein the information includes user-selected specifications for customizing and personalizing features of the achievement recognition item for an achievement selected by the user from the pre-populated list; and
store the received information.

10. The system of claim 9 wherein the achievement recognition item comprises text that reflects an achievement attained by the user.

11. The system of claim 10 wherein the achievement recognition item comprises a document mounted on or embedded in a substrate, wherein the document reflects an achievement attained by the user.

12. The system of claim 11 wherein the user-selected specifications include a substrate material.

13. The system of claim 11 wherein the user-selected specifications include a color for the substrate.

14. The system of claim 10 wherein the user-selected specifications include text that reflects the achievement attained by the user.

15. The system of claim 10 wherein the achievement recognition item comprises an engraved plate mounted on a substrate, wherein the user-selected specifications include text to be engraved on the plate.

16. The system of claim 15 wherein the user-selected specifications include at least one of the following: (i) type style of the text and (ii) font size of the text.

17. An article comprising a machine-readable medium storing machine-executable instructions that, when applied to a machine, cause the machine to:
provide an on-line, interactive network site including a personalized network page from which a user can customize and personalize specifications for a three-dimensional achievement recognition item, wherein the personalized network page includes a pre-populated list of one or more achievements attained by the user, any of which the user can select for customizing and personalizing an achievement recognition item; and
store information received through the network site from the user, wherein the information includes user-selected specifications for customizing and personalizing features of the achievement recognition item for an achievement selected by the user from the pre-populated list.

18. The article of claim 17 wherein the achievement recognition item comprises text that reflects an achievement attained by the user.

19. The article of claim 18 wherein the achievement recognition item comprises a document mounted on or embedded in a substrate, wherein the document reflects an achievement attained by the user.

20. The article of claim 19 wherein the user-selected specifications include a substrate material.

21. The article of claim 19 wherein the user-selected specifications include a color for the substrate.

22. The article of claim 18 wherein the user-selected specifications include text that reflects the achievement attained by the user.

23. The article of claim 18 wherein the achievement recognition item comprises an engraved plate mounted on a substrate, wherein the user-selected specifications include text to be engraved on the plate.

24. The article of claim 23 wherein the user-selected specifications include at least one of the following: (i) type style of the text and (ii) font size of the text.

25. A method comprising:
accessing a personalized page of an on-line, interactive network site to customize and personalize specifications for an achievement recognition item, wherein the personalized network page includes a pre-populated list of one or more achievements attained by the user, any of which the user can select for customizing and personalizing an achievement recognition item;
using the personalize page to select an achievement from among the one or more achievements in the pre-populated list; and
entering information through the personalized page to order the achievement recognition item, wherein the information includes user-selected specifications for customizing and personalizing features of the selected achievement recognition item for the selected achievement.

26. The method of claim 25 wherein the achievement recognition item comprises text that reflects an achievement attained by the user.

27. The method of claim 26 wherein the achievement recognition item comprises a document mounted on or embedded in a substrate, wherein the document reflects an achievement attained by the user.

28. The method of claim 27 wherein the user-selected specifications include a substrate material.

29. The method of claim 27 wherein the user-selected specifications include a color for the substrate.

30. The method of claim 26 wherein the user-selected specifications include text that reflects the achievement attained by the user.

31. The method of claim 26 wherein the achievement recognition item comprises an engraved plate mounted on a substrate, wherein the user-selected specifications include text to be engraved on the plate.

32. The method of claim 31 wherein the user-selected specifications include at least one of the following: (i) type style of the text and (ii) font size of the text.

* * * * *